United States Patent
Kulczyk (10) Patent No.: US 8,157,440 B2
(45) Date of Patent: Apr. 17, 2012

(54) TEMPERATURE SENSOR AND METHOD FOR MEASURING TEMPERATURE

(75) Inventor: Wojciech Konrad Kulczyk, Farnborough (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 871 days.

(21) Appl. No.: 12/155,666

(22) Filed: Jun. 6, 2008

(65) Prior Publication Data

US 2009/0154522 A1 Jun. 18, 2009

(30) Foreign Application Priority Data

Dec. 18, 2007 (GB) .................................. 0724630.9

(51) Int. Cl.
*G01K 13/02* (2006.01)
*G01K 13/12* (2006.01)
(52) U.S. Cl. ......... 374/138; 374/135; 374/109; 374/141
(58) Field of Classification Search .................. 374/4, 7, 374/16, 28, 27, 29, 30, 100, 45, 109, 208, 374/141, 135, 138, 148, 147, E13.006, 114, 374/43; 702/45, 47, 50, 100, 130, 33–34, 702/39–40; 73/861.02, 861.03, 215, 23.36, 73/861.05, 866.05, 23.24, 23.25, 23.26, 23.27, 73/1.16, 199, 200, 73; 137/486, 487.5
See application file for complete search history.

(56) References Cited

U.S. PATENT DOCUMENTS

| | | | |
|---|---|---|---|
| 2,588,840 A | 3/1952 | Howland | |
| 2,928,279 A * | 3/1960 | Schober | ........................ 374/138 |
| 2,970,475 A | 2/1961 | Werner | |
| 3,181,360 A * | 5/1965 | Hederhorst | ...................... 73/270 |
| 3,378,022 A * | 4/1968 | Sorenson | ...................... 137/805 |
| 4,365,131 A | 12/1982 | Hansman, Jr. | |
| 4,509,550 A | 4/1985 | Monk | |
| 4,682,626 A | 7/1987 | Bergmann | |
| 4,732,351 A | 3/1988 | Bird | |
| 5,029,440 A | 7/1991 | Graber et al. | |
| 5,553,461 A * | 9/1996 | Hitzigrath et al. | ............... 62/150 |
| 5,623,821 A | 4/1997 | Bouiller et al. | |
| 5,653,538 A * | 8/1997 | Phillips | ........................ 374/138 |
| 6,840,672 B2 | 1/2005 | Ice et al. | |
| 7,225,085 B2 * | 5/2007 | Zhang et al. | ..................... 702/45 |
| 7,421,911 B2 * | 9/2008 | Desrochers et al. | ........ 73/863.03 |
| 2003/0058919 A1 | 3/2003 | Ice et al. | |
| 2008/0159354 A1* | 7/2008 | Fleming et al. | ............... 374/138 |
| 2010/0063765 A1* | 3/2010 | Carlisle et al. | ................ 702/100 |
| 2010/0125424 A1* | 5/2010 | Ding et al. | ....................... 702/47 |
| 2011/0022334 A1* | 1/2011 | Ding et al. | ....................... 702/47 |

FOREIGN PATENT DOCUMENTS

| | | |
|---|---|---|
| EP | 1 739 013 | 1/2007 |
| GB | 2 203 251 | 10/1986 |
| SE | 1046627 | 10/1983 |
| WO | 95/08122 | 3/1995 |

* cited by examiner

*Primary Examiner* — Gail Verbitsky
(74) *Attorney, Agent, or Firm* — Nixon & Vanderhye P.C.

(57) ABSTRACT

The invention provides a total gas temperature sensor for measuring the temperature of gas in a gas flow. A gas temperature sensor in accordance with the invention comprises a measurement chamber having a gas inlet and a gas outlet; an outlet valve located at the gas outlet, operable to seal the gas outlet when in a closed position, and a temperature sensing element located in the measurement chamber. The sensor is simple to manufacture, is robust, provides for a low recovery correction and does not suffer from significant boundary layer problems.

8 Claims, 7 Drawing Sheets

TEMPERATURE SENSOR AND METHOD FOR MEASURING TEMPERATURE

This application claims priority to Great Britain Application No. 0724630.9, filed 18 Dec. 2007, the entire contents of each of which are hereby incorporated by reference.

The present invention relates to a system and method for measuring the total temperature of a gas. In particular, the invention is applicable to total air temperature sensing on aircraft.

Total air temperature (TAT) is a measure of air temperature that is used for air flows. TAT is the static air temperature plus the adiabatic temperature rise of the air produced by the complete conversion of the kinetic energy of the air into thermal energy.

Total Air Temperature can be expressed by the following equation:

$$T_{TAT} = T_S \left[ 1 + \frac{\gamma - 1}{2} M^2 \right]$$

where
Ts is the Static Air Temperature
M is the free stream Mach number
γ is the ratio of gas specific heats (1.4 at 0 deg. C.)

The free stream Mach number M is a measure of the speed of the air flow past the sensor.

However the measured temperature, sometimes called the recovered temperature, is different from the total temperature because of incomplete conversion of the gas motion energy into the thermal energy.

Therefore the recovered temperature is given by:

$$T_R = T_S \left[ 1 + r \frac{\gamma - 1}{2} M^2 \right]$$

where r is the recovery factor and is defined as:

$$r = \frac{T_R - T_S}{T_{TAT} - T_S}$$

The recovery factor depends on the effectiveness of the sensor in capturing the adiabatic temperature rise and on the ratio between the internal and external air velocities. The recovery factor also depends on the construction of the probe and varies with Mach number.

The recovered temperature $T_R$ can be expressed more conveniently by:

$$T_R = T_{TAT}(1-\eta)$$

where $$\eta = \frac{T_{TAT} - T_R}{T_{TAT}}$$

and is called the recovery correction.

Total air temperature measurement is critical to many aircraft systems. TAT sensors mounted on the aircraft body provide information about the air temperature that can be used to calculate true air speed. TAT sensors mounted at the inlet to gas turbine engines are used to provide accurate engine power settings and to select engine pressure ratios prior to take off. TAT measurements are also required for stall control, with inlet guide vane scheduling and for calculation of engine parameters such as corrected speed, fuel flow and fuel consumption.

The basic architecture of TAT sensors on aircraft has remained unchanged for many years. U.S. Pat. No. 2,588,840 and U.S. Pat. No. 2,970,475 describe the principles of operation and the basic architecture of these sensors.

Figure 1:
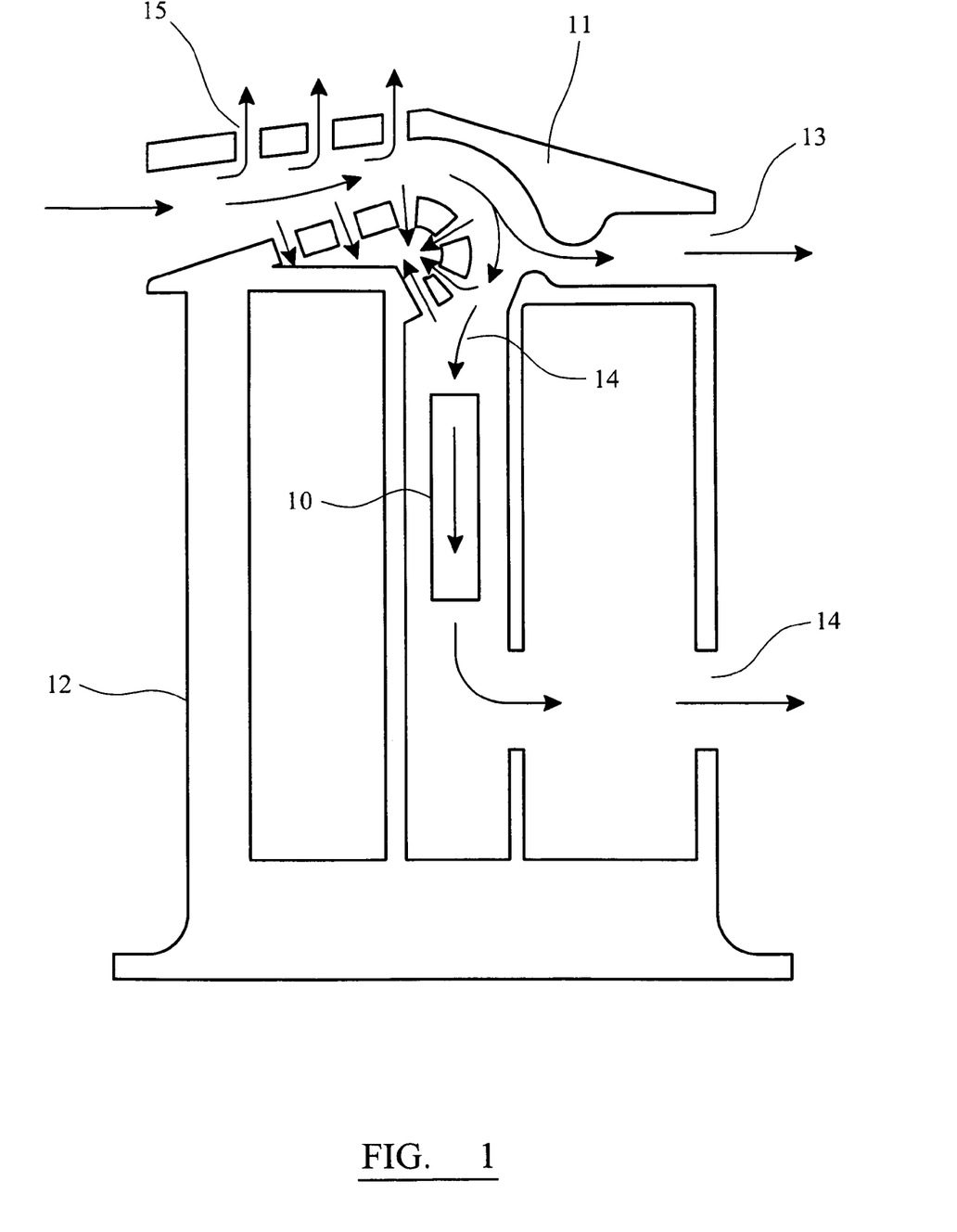
FIG. 1 illustrates a total air temperature probe in accordance with the prior art.

Prior TAT sensors comprise a temperature sensing element 10 mounted inside a housing 11 through which air flows, as illustrated in FIG. 1. The arrows in FIG. 1 indicate the direction of air flow. The housing is mounted on a strut 12 so that the sensor air inlet is positioned away from the aircraft body and the associated boundary layer of air. The sensors work by slowing down the flow of air through the housing so that the kinetic energy of the air is converted into an adiabatic temperature rise. The airflow is divided into a through channel 13 and a deflected channel 14. The sensing element 10 is located in the deflected path. The air channels 13 and 14 are arranged in such as way that the air speed past the sensor is very much reduced. Dividing the airflow in this way also reduces the amount of water droplets and debris that impinge on the sensing element 10.

There are a number of technical problems with this basic solution that have led to very complex mechanical and electrical configurations for the sensors.

One parameter that affects the accuracy of TAT measurements is the boundary layer formed inside the sensor housing. Typically, during flight the temperature of the walls of the housing surrounding the sensor is lower than the air temperature. The air close to the walls is therefore cooler that the air in the centre of the housing. The air close to the walls also moves more slowly than the air passing through the centre of the housing and so forms a boundary layer of cool air. At low air speeds, the boundary layer thickness can build up to the extent that it will affect the measured temperature.

In order to control the thickness of the boundary layer, prior designs have included a complex array of apertures 15 within the housing, as shown in FIG. 1, designed to bleed off air from the boundary layer and thus control its thickness. The size and position of these holes has been empirically determined so as to reduce the effect of the boundary layer without affecting the main flow of air through the sensor. The need for accurate fabrication of the sensor housing including these holes is a major factor in the high cost of the probe.

Another problem with prior total air temperature sensors is that they are not able to completely convert the kinetic energy of the gas into an adiabatic temperature rise. The recovery correction typically varies with Mach number from 0 to about 0.6%.

A further problem associated with prior total air temperature sensors is the build up of ice on the sensor housing. The solution to the problem of build up of ice on the sensor housing has been to include heater elements within the housing itself. However, the de-icing heater elements affect the accuracy of the temperature measurement, as the generated heat is detected by the temperature sensor. This effect is more prominent at low speeds and can result in an error of up to 8° C. The heating elements can actually cause the boundary layer of air close to the interior surfaces of the housing to have a higher temperature than the main airflow and at low speed the thickness of the boundary layer can be enough to contact the sensing element.

Aspects of the present invention are intended to address these problems or at least provide a useful alternative. Although the preceding discussion refers to total air temperature, the same considerations apply to other gases, and so the invention can be applied to any gas or mixture of gases.

In a first aspect, the present invention provides a temperature sensor and a method of sensing temperature as defined in the appended claims, to which reference should now be made. This aspect of the invention provides a sensor that is simple to manufacture, is robust, provides for a low recovery correction and does not suffer from significant boundary layer problems. Preferred features are defined in the dependent claims.

The present invention also provides apparatus and methods for de-icing a temperature sensor that do not significantly affect temperature measurements taken by the temperature sensor and that use a low power. In accordance with one aspect of the invention, there is provided a gas probe including an apparatus for reducing ice formation on a housing of the gas probe, the apparatus comprising a transducer mounted to the housing so as, in use, to produce ultrasonic vibrations in the housing; and driving means for driving the transducer at a frequency that reduces the formation of ice on the housing. In a preferred embodiment, the driving means drives the transducer at a frequency between 10 and 500 MHz.

The transducer may be mounted to the housing so as to produce vibrations at a gas inlet of the housing.

In the described embodiment, the gas probe is a temperature sensor. The gas probe may be a sensor in accordance with the first aspect of the invention and may be a total air temperature sensor.

In accordance with a further aspect of the invention, there is provided a method for reducing ice formation on a housing of a gas probe, comprising the step of inducing ultrasonic vibrations in the housing. The ultrasonic vibrations are preferably of a frequency between 10 and 500 MHz.

In accordance with a still further aspect of the invention, there is provided a gas probe including an apparatus for reducing ice formation on the housing of the probe, the apparatus comprising a microwave source for generating microwaves; and focussing means associated with the microwave source, such that in use, the microwaves are incident on a region of a gas inlet of the gas probe.

The microwave source may be a solid-state device. The gas probe may be a temperature sensor. The gas probe may a sensor in accordance with the first aspect of the invention. The gas probe may be a total air temperature sensor.

In accordance with a still further aspect of the invention, there is provided a method for reducing ice formation on a gas probe, comprising the step of directing microwaves at a gas inlet of the gas probe.

Embodiments of the invention will now be described in detail, with reference to the accompanying drawings, in which.

Figure 2A:
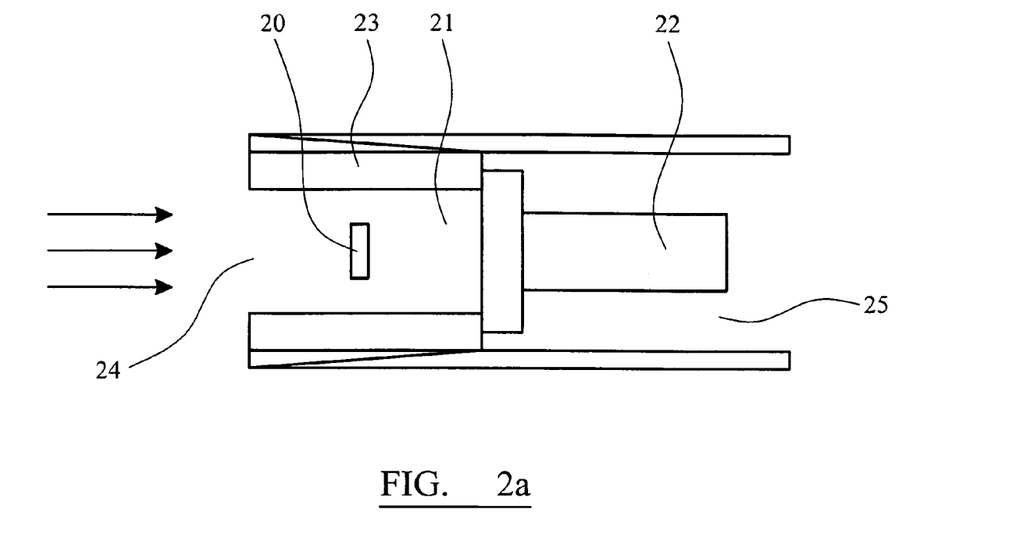
FIG. 2a is a schematic illustration of an air temperature probe in accordance with the present invention, with the valve in a closed position.
Figure 2B:
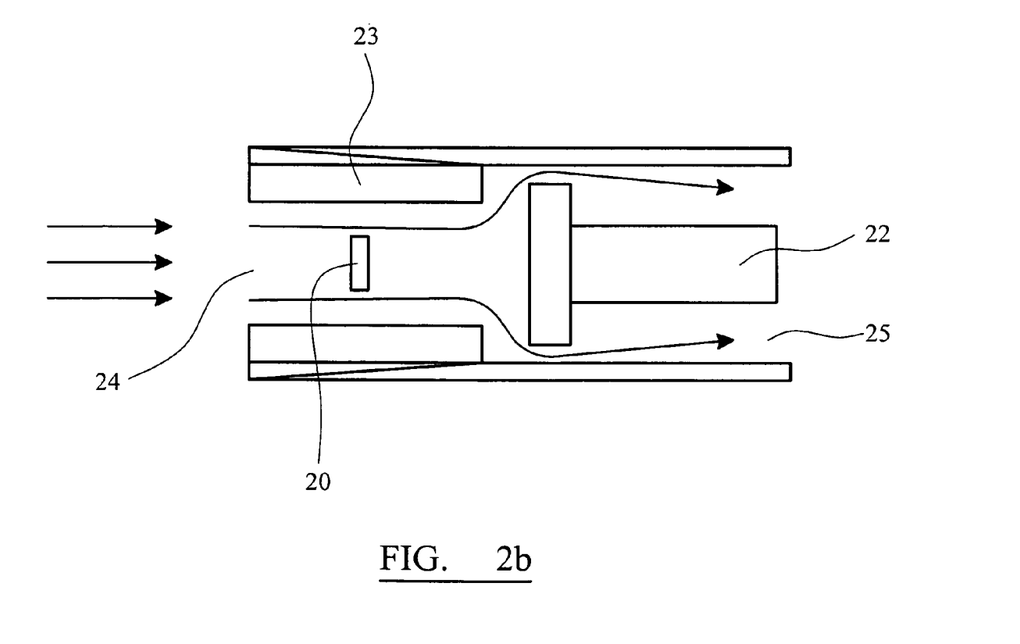
FIG. 2b shows the temperature sensor of FIG. 2a with the valve in the open position.

FIGS. 2a and 2b are schematic illustrations of the essential elements of a TAT sensor in accordance with the present invention. A temperature sensing element 20 is located in a measurement chamber 21. The chamber comprises side walls 23, an air inlet 24 and an air outlet 25. The air outlet 25 can be sealed by a valve 22. In FIG. 2a, the valve is in a closed position, sealing the outlet 25. In FIG. 2b, the valve is in an open position allowing the air to flow through the measurement chamber.

In this embodiment, the temperature sensing element is a resistance temperature device (RTD), such as a platinum resistance thermometer (PRT) of either a wire wound or sintered film type, a tungsten resistor or a rhodium-iron RTD. Alternatively, a thermistor, such as a diamond thermistor, a thermocouple or optical temperature sensor may be used.

The valve in FIG. 2 is illustrated schematically and may be any suitable type of valve or device for selectively sealing an unsealing the air outlet. It is preferably a micro-electrical mechanical system (MEMS) valve. Robust and reliable MEMS valves that can operate at high frequency (in the order of 1 KHz) are now available and are ideally suited to the present invention. A MEMS valve can be fabricated specifically for a TAT sensor in accordance with the invention, having the desired performance characteristics. Alternatively a solenoid valve or any other suitable type of valve may be used.

The chamber sidewalls 23 can be made of any suitable material. In MEMS devices, silicon is a preferred material.

The measurement chamber shown in FIG. 2 has a circular cross-section, with a diameter of approximately 3-5 mm. However, other cross-sectional shapes and dimensions are possible.

Figure 5:
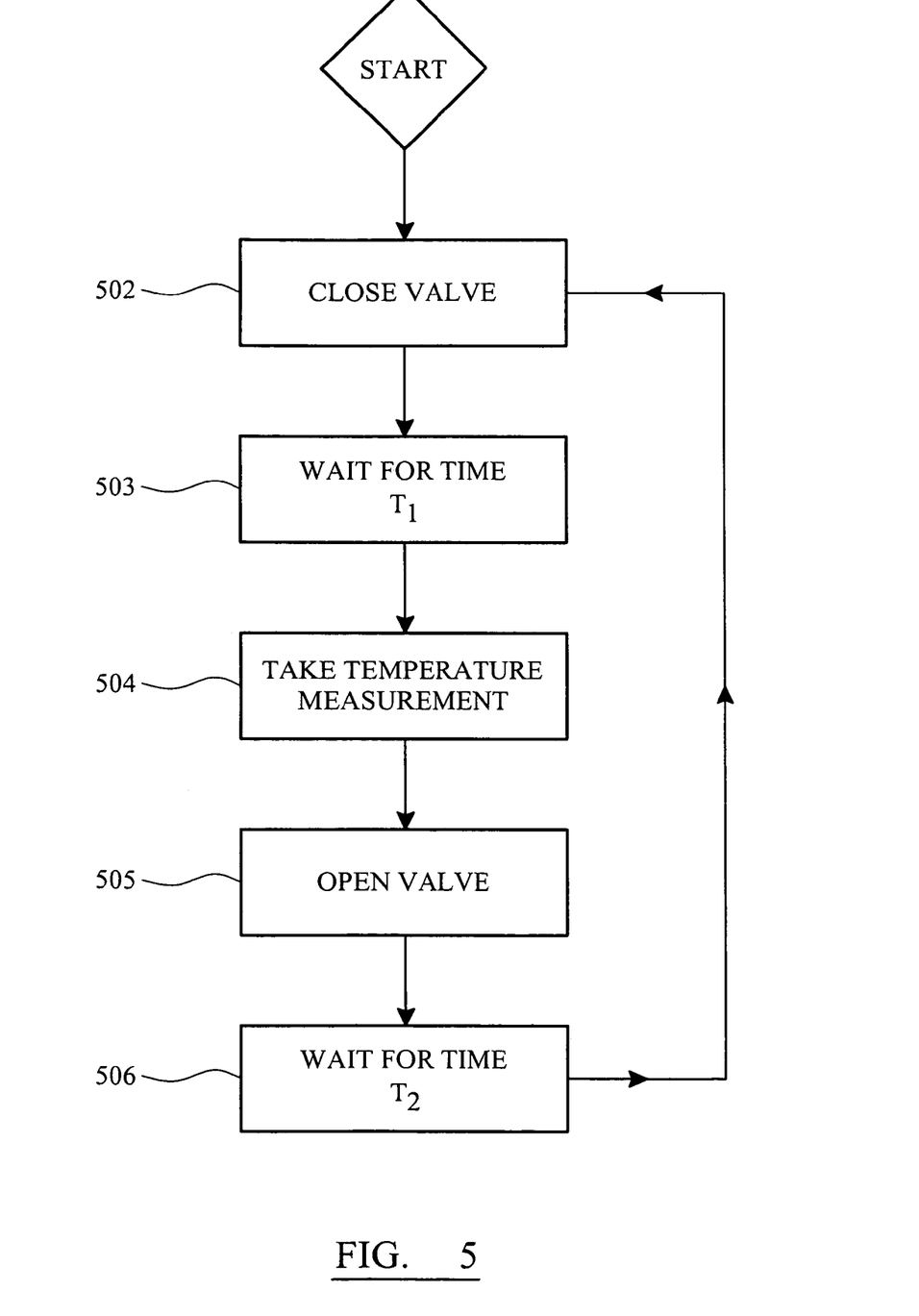
FIG. 5 is a flow diagram illustrating the method steps for sensing total air temperature in accordance with the present invention.

The operation of the TAT sensor shown in FIG. 2 will now be described, with reference to FIG. 5. With the valve 22 in an open position, as shown in FIG. 2b, air flows through the measurement chamber. The valve is then moved to a closed position, as shown in FIG. 2a, in step 502. The air flow through the chamber is stopped, resulting in conversion of the kinetic energy of the air into a temperature rise inside the measurement chamber. While the valve is closed a temperature measurement is taken from the temperature sensing element 20, in step 504. The temperature measurement is taken only a short time, in this example within 10 milliseconds, after the valve is closed. The short delay between valve closure and measurement is shown as step 503. This ensures that there is insufficient time for any significant thermal transfer between the air and the housing before measurement. The valve is then opened again in step 505 to allow air to flow through the chamber as shown in FIG. 2b. The valve remains open for a short period, again of the order of 10 milliseconds, shown as step 506, before the process is repeated and another temperature measurement taken. A practically continuous TAT measurement is obtained in this way. Typical sampling time in an aircraft engine control unit is about 20 ms and this is a reasonable temperature sampling rate. For a minimum airflow of 10 m/s, the air in the measurement chamber will be replaced in a few milliseconds.

This mode of operation provides almost complete recovery of the kinetic energy of the airflow, resulting in a low recovery correction factor. The speed of operation of the valve also prevents the build up of a boundary layer within the measurement chamber. Air is stopped as a result of the valve being closed but is then flushed through the measurement chamber after the valve is opened. The temperature measurement is taken very shortly after the valve is closed preventing any significant thermal transfer from the sidewalls.

It is possible to take a plurality of temperature measurements per cycle of the valve, i.e. a plurality of measurements may be taken during each period when the valve is closed. Equally, temperature measurements may be taken only once every few cycles of the valve.

Figure 3:
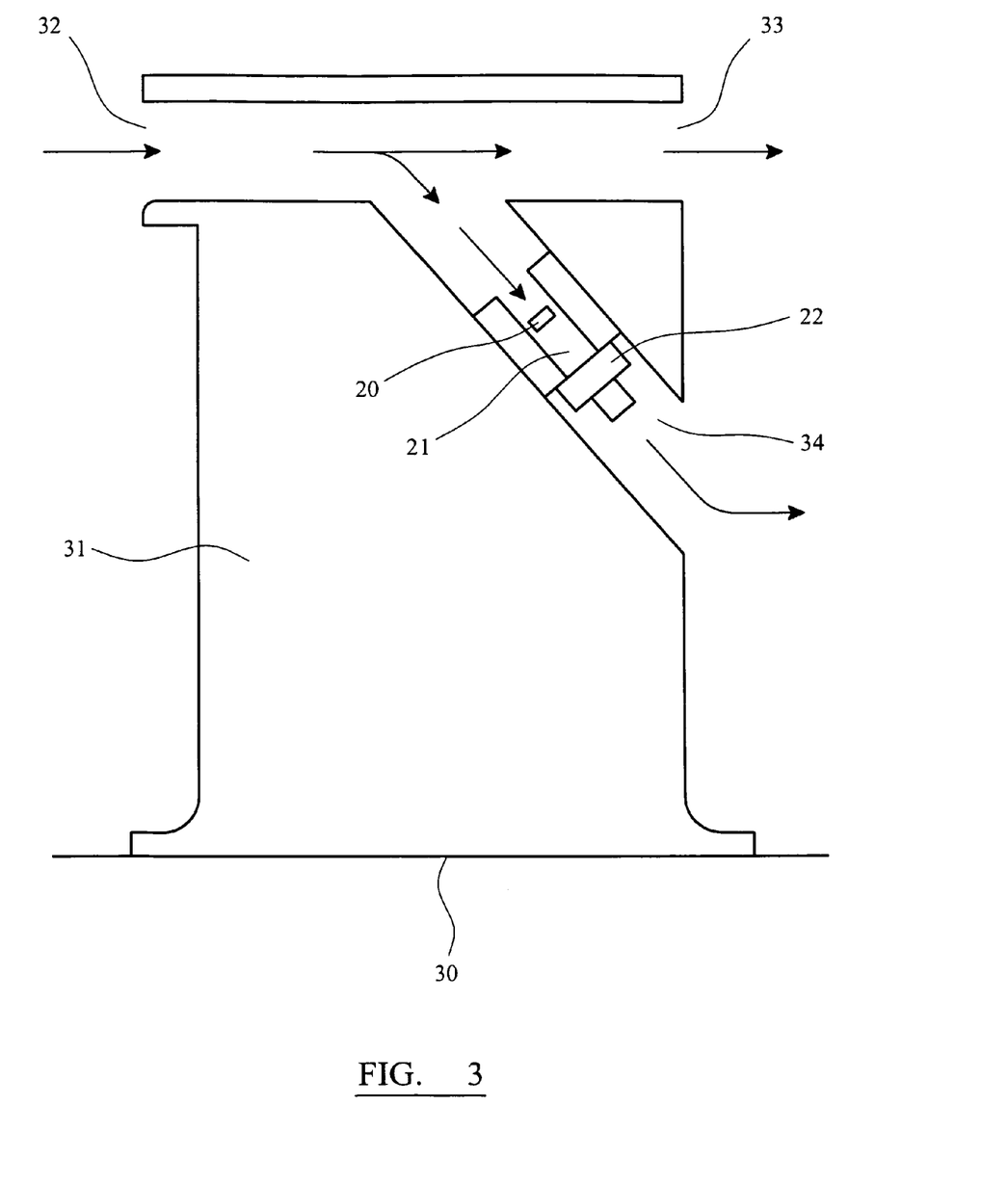
FIG. 3 illustrates a sensor in accordance with the present invention mounted within a housing.

FIG. 3 is an illustration of a TAT sensor in accordance with the present invention. The sensing element and measurement chamber are mounted within a housing similar to that used for prior TAT sensors. The sensor is mounted to the aircraft body 30 on a vane 31. Air flows through inlet 32. The air flow is then split between a straight through path exiting through outlet 33 and a deflected path exiting through outlet 34, via the measurement chamber 21. The deflection of the air before it enters the measurement chamber passes the sensing element reduces the amount of solid particles and water droplets that enter the measurement chamber. As the valve is used to stop air flow it is less crucial that air is slowed before entering the measurement chamber. Boundary layer control is also less critical. As a result, the air channels can be made to a simpler and cheaper design.

Figure 4:
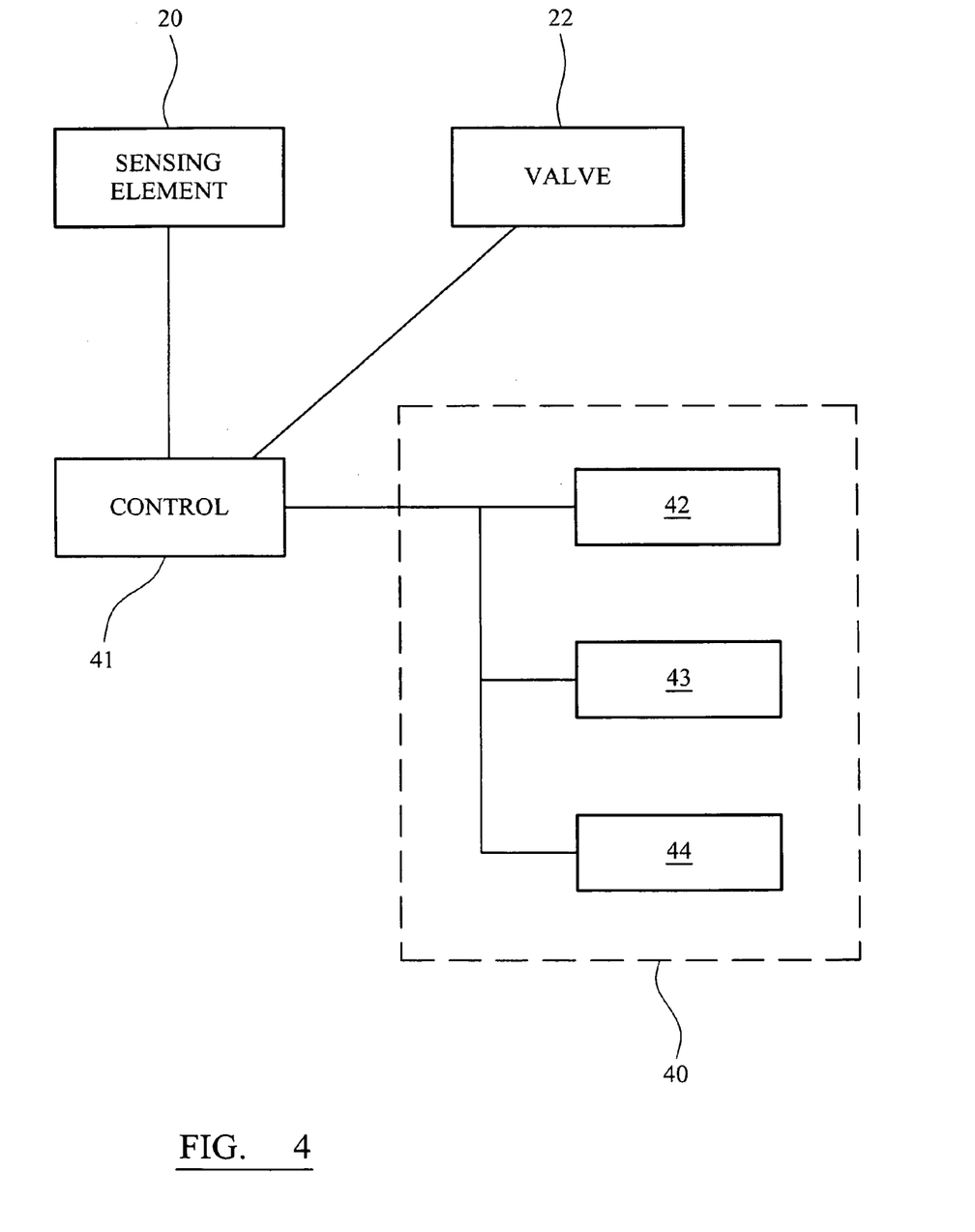
FIG. 4 is a schematic illustration of the electronic components of an air temperature sensing system in accordance with the present invention.

FIG. 4 is a schematic diagram showing the electronic control elements associated with a TAT sensor in accordance with the present invention. Both the temperature sensing element 20 and the valve 22 are connected to an electronic controller 41. The controller 41 synchronises the operation of the sensing element of the valve so that temperature measurements are taken at a predetermined time following closure of the valve. The controller 41 also controls the frequency of operation of the valve 22. The frequency of operation of the valve may be adjusted according to particular environmental conditions and engine speed. The controller 41 may be formed from any suitable electronic components and may be formed as hardware alone or as a combination of hardware and software and/or firmware.

The results of the temperature measurements taken by the sensing element are passed from the controller 41 into elements of the aircraft control system 40. The total air temperature measurements are passed to the Air dData Computer 42, the Full Authority Digital Engine Control (FADEC) 43, and to the Cockpit display 44.

It is possible to take total air pressure measurements in the measurement chamber as well. For example, MEMS pressure measurement devices may be incorporated into the chamber walls or into the valve.

Figure 6:
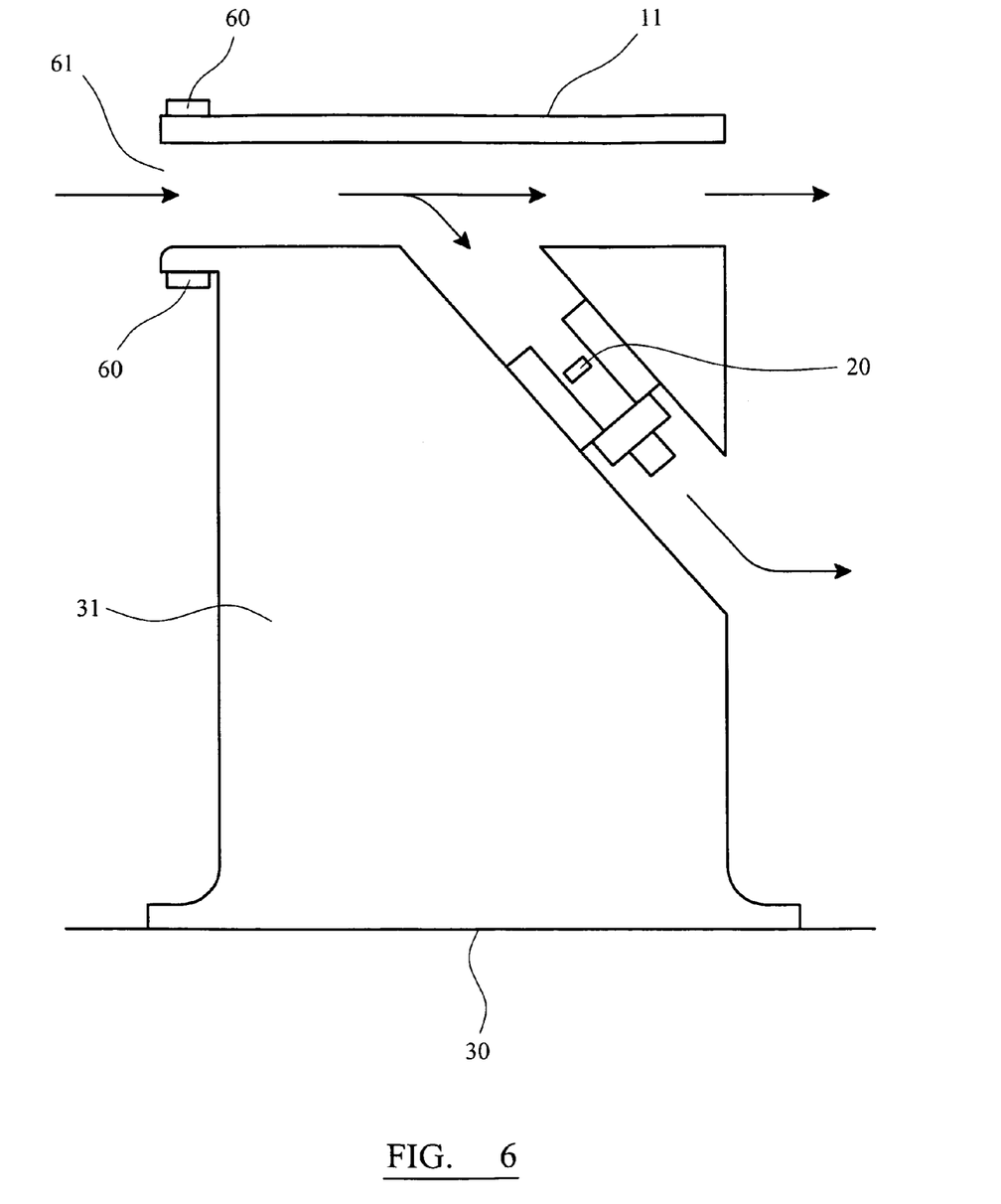
FIG. 6 illustrates a de-icing system for use with the present invention.

FIG. 6 illustrates a second aspect of the present invention. FIG. 6 shows a TAT probe mounted to an aircraft body 30. The TAT probe may be of the type shown in FIG. 1 or of a type in accordance with the first aspect of the invention as shown in FIG. 3. Mounted to the sensor housing 11 at the air inlet 61 are piezo-electric transducers 60 that are operable to produce ultrasonic vibrations in the housing 11. The transducers are driven (by electronic control means not shown) at a frequency chosen to optimally prevent deposition of any ice crystals approaching the inlet 61. The maximum interaction between ultrasonic waves and small particles occurs when the wavelength of waves is close to the size of particles.

$$f=V/\lambda$$

where f is the frequency, V is the wave velocity in material and λ is the wavelength of the wave e.g. for V=5000 m/sec and d=0.025 mm, f=200 MHz.

The transducers can be mounted to the housing to produce different types of waves in the housing, e.g. shear, longitudinal, transverse. These waves may be generated in combination or separately and at the same or different frequencies.

The transducers require low power in comparison to the heater elements of the prior art. Furthermore, the transducers may be quickly switched on when icing conditions are detected and turned off otherwise, saving power.

One significant advantage of using ultrasonic transducers to reduce the build up of ice at the inlet to the TAT sensor is that there is no heating of the incoming air and so no interference with the temperature measurement taken by the TAT sensor. In contrast, prior solutions, incorporating heating elements into the housing do affect the accuracy of temperature measurements taken by a TAT probe.

FIG. 6 shows ultrasonic transducers used with a TAT probe, but transducers may be used in any type of gas probe when ice build up is an issue. It is also possible to use transducers in conjunction with other de-icing techniques, such as heating elements.

Figure 7:
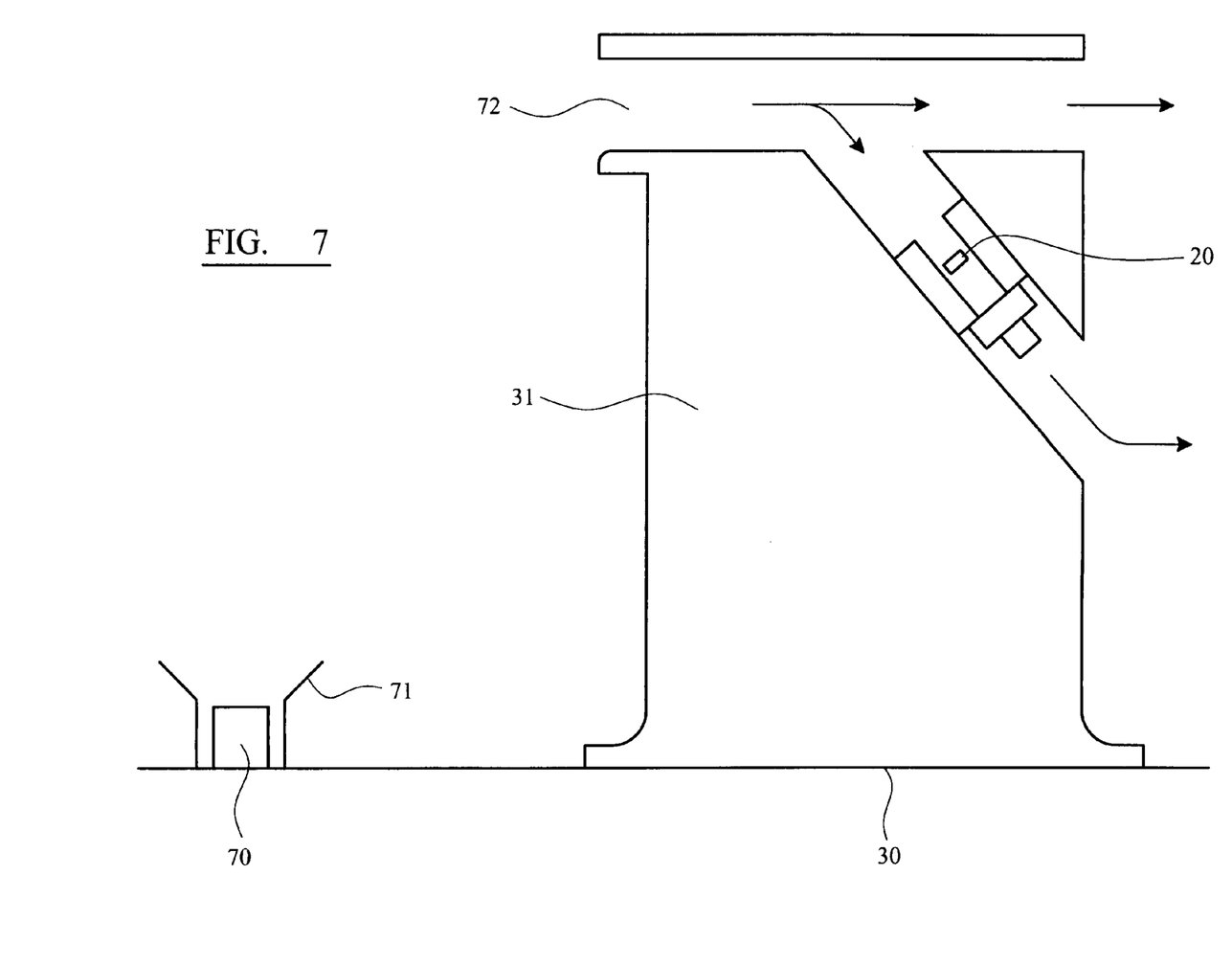
FIG. 7 illustrates a second de-icing system suitable for use with the present invention.

FIG. 7 illustrates a third aspect of the invention, which is another apparatus and method of preventing ice build up at the inlet to a TAT probe. The TAT probe shown in FIG. 7 may be of the type in accordance with the first aspect of the invention as shown in FIG. 3 or may be a TAT probe in accordance with the prior art, as shown in FIG. 1. The system shown in FIG. 7 may also be applied to other types of gas probes and with other de-icing techniques.

The system in FIG. 7 shows a microwave source 70 mounted to the aircraft body 30 including microwave focussing element 71 for focussing the emitted microwave radiation onto the inlet 72 of the TAT probe or just upstream of the inlet. The microwave radiation is of a frequency (2.45 GHz) that is strongly absorbed by water (and ice) but is not strongly absorbed by air or by the material of the housing. The microwave radiation will be absorbed by any ice crystals and will melt the ice crystals prior to entry into the probe without significantly heating the surrounding air. The microwave source 70 should be mounted close to the inlet (e.g. 3-4 cm away) so that the microwaves can reach ice deposited on the inside of the housing on the lower lip. A significant advantage of using a microwave source is that ice build up is prevented without significantly affecting the temperature of the air entering the probe or the temperature of the housing, and so the accuracy of the temperature measurement is not compromised.

Any suitable microwave source may be used in the system shown in FIG. 7. Solid-state microwave sources, such as IMPATT diodes, are now widely available which are low power when compared to the heating elements of the prior art and are robust. These solid state microwave sources can be simply mounted to an aircraft body and can be quickly switched on when icing conditions are detected and switched off otherwise. The focussing elements ensure that the power required is kept to a minimum and that the microwaves do not interfere with any electronic systems on the aircraft.

The invention claimed is:

1. A total air temperature sensor for measuring the total air temperature of a flow of air, said sensor comprising;
    a measurement chamber having an air inlet and an air outlet;
    an outlet valve located at the air outlet, said outlet valve configured to seal the air outlet and stop the flow of air in the measurement chamber when in a closed position; and
    a temperature sensing element located in the measurement chamber, said temperature sensing element configured to provide an output indicative of the total air temperature when the outlet valve is in the closed position.

2. A total air temperature sensor according to claim 1, further comprising a controller, wherein the controller is connected to the outlet valve and to the temperature sensing element, and wherein the controller is configured to synchronise the operation of the outlet valve and the temperature sensing element.

3. A total air temperature sensor according to claim 2, wherein the controller is configured to control the outlet valve to move between the closed position and an open position at a predetermined frequency.

4. A total air temperature sensor according to claim 2, wherein the controller is configured to store a temperature measurement from the temperature sensor within a predetermined time of the outlet valve moving to a closed position.

5. A total air temperature sensor according to claim 1, wherein the temperature sensing element is a resistance temperature device.

6. A total air temperature sensor according to claim 1, wherein the outlet valve is a micro-electrical mechanical systems (MEMS) valve or a solenoid driven valve.

7. A total air temperature sensor according to claim 1, further comprising:
a housing, wherein the measurement chamber is located within the housing, and de-icing means for reducing the build-up of ice on the housing wherein said de-icing means comprises an ultrasonic transducer or a microwave source.

8. A total air temperature sensor for measuring the total air temperature of a flow of air, said sensor comprising:
a measurement chamber having an air inlet and an air outlet;
an outlet valve located at the air outlet, said outlet valve configured to seal the air outlet when in a closed position;
a temperature sensing element located in the measurement chamber; and
a controller, said controller connected to the outlet valve and to the temperature sensing element, and the controller is configured to control the outlet valve to move between the closed position and an open position at a predetermined frequency and to record total air temperature measurements from the temperature sensing element when the outlet valve is in the closed position.

* * * * *